United States Patent
Gea Aguilera et al.

(10) Patent No.: US 11,732,588 B2
(45) Date of Patent: *Aug. 22, 2023

(54) PROFILED STRUCTURE FOR AN AIRCRAFT OR TURBOMACHINE FOR AN AIRCRAFT

(71) Applicants: SAFRAN AIRCRAFT ENGINES, Paris (FR); OFFICE NATIONAL D'ETUDES ET DE RECHERCHES AEROSPATIALES, Palaiseau (FR)

(72) Inventors: Fernando Gea Aguilera, Moissy-Cramayel (FR); Raphaël Barrier, Paris (FR); Mathieu Simon Paul Gruber, Moissy-Cramayel (FR); Cyril Polacsek, Clamart (FR); Hélène Dominique Jeanne Posson, Moissy-Cramayel (FR)

(73) Assignees: SAFRAN AIRCRAFT ENGINES, Paris (FR); OFFICE NATIONAL D'ETUDES ET DE RECHERCHES AEROSPATIALES, Palaiseau (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/076,976

(22) Filed: Dec. 7, 2022

(65) Prior Publication Data
US 2023/0123376 A1    Apr. 20, 2023

Related U.S. Application Data

(63) Continuation of application No. 16/657,278, filed on Oct. 18, 2019, now Pat. No. 11,560,796.

(30) Foreign Application Priority Data

Oct. 18, 2018 (FR) ........................ 1859663

(51) Int. Cl.
F01D 5/14 (2006.01)
F01D 9/04 (2006.01)
(Continued)

(52) U.S. Cl.
CPC .............. *F01D 5/141* (2013.01); *B64C 3/10* (2013.01); *B64C 11/18* (2013.01); *B64C 21/10* (2013.01); *F01D 9/041* (2013.01)

(58) Field of Classification Search
CPC .................................. F01D 5/141; F01D 9/041
See application file for complete search history.

(56) References Cited

U.S. PATENT DOCUMENTS 7,413,408 B1    8/2008 Tafoya
9,249,666 B2 *  2/2016 Wood ...................... F01D 5/141
(Continued)

FOREIGN PATENT DOCUMENTS

CN    104612758    5/2015
CN    209192204    8/2019

OTHER PUBLICATIONS

French Application No. 1859663; Search Report dated Jun. 19, 2019—16 pgs. (In French; relevance found in the citations therein).

*Primary Examiner* — Michael L Sehn
(74) *Attorney, Agent, or Firm* — Cozen O'Connor

(57) ABSTRACT

A turbomachine includes a rotor and a stator, the stator having a plurality of profiled structures, each profiled structure being elongated in a direction of elongation in which the profiled structure has a length exposed to an airflow, and having a leading edge and/or a trailing edge, at least one of which is profiled and has, in said direction of elongation, serrations defined by a succession of peaks and troughs and having a geometric pattern transformed, over at least a part of said length exposed to the airflow, by successive scaling, via multiplicative factors, in the direction of elongation (Continued)

and/or transverse to the direction of elongation. The geometric pattern, as defined with reference to a radial distribution of the integral scale of the turbulence, evolves in a non-periodic manner.

11 Claims, 10 Drawing Sheets

(51) Int. Cl.
*B64C 3/10* (2006.01)
*B64C 21/10* (2006.01)
*B64C 11/18* (2006.01)

(56) References Cited

U.S. PATENT DOCUMENTS

| | | |
|---|---|---|
| 2011/0198444 A1 | 8/2011 | Dong et al. |
| 2013/0164488 A1 | 6/2013 | Wood et al. |
| 2013/0170999 A1 | 7/2013 | Vassilicos |
| 2015/0152875 A1* | 6/2015 | Kamiya ............... F04D 29/681 416/147 |
| 2017/0226865 A1 | 8/2017 | Kray et al. |
| 2018/0023398 A1 | 1/2018 | Jones et al. |
| 2018/0057141 A1 | 3/2018 | Shormann |

* cited by examiner

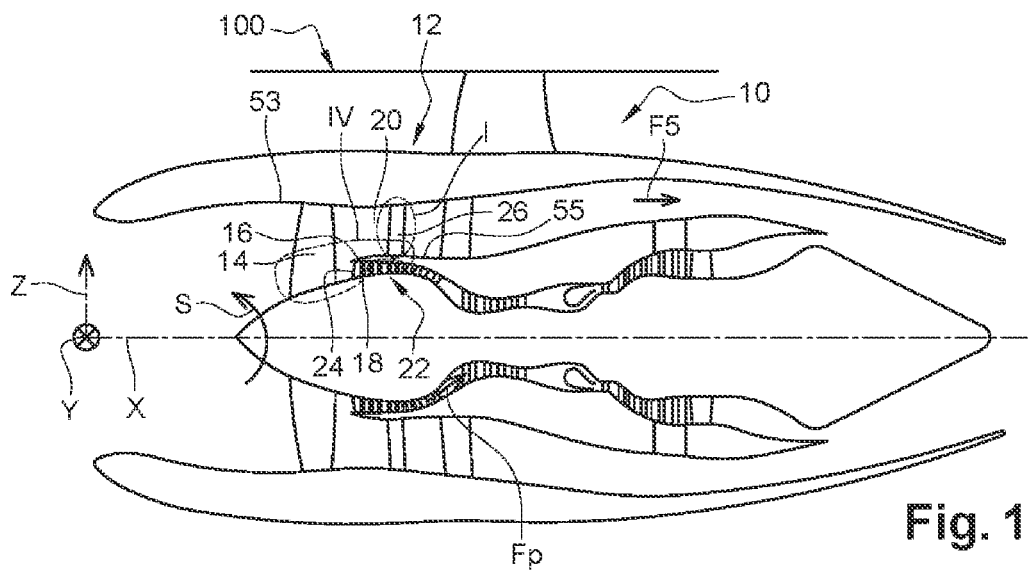
Fig. 1
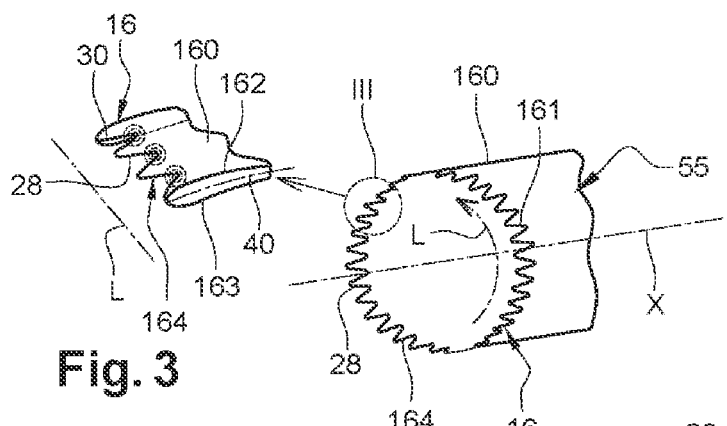
Fig. 3
Fig. 2
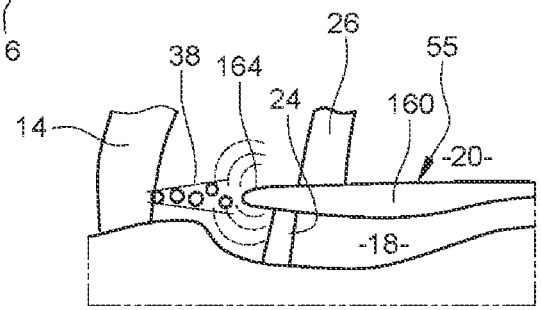
Fig. 4

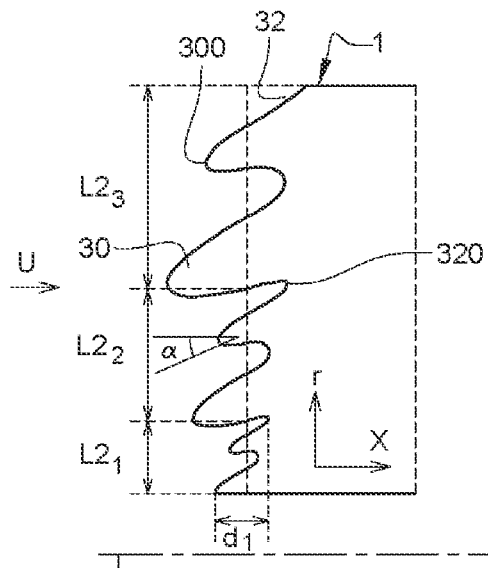
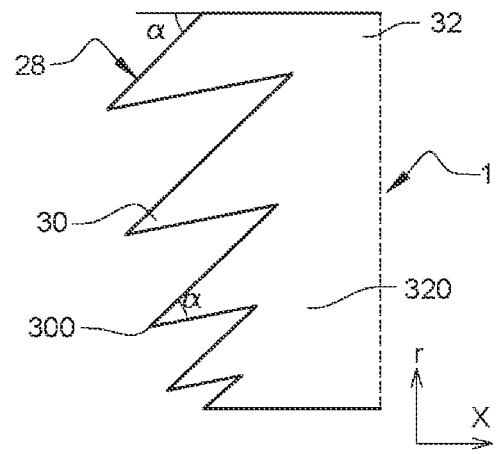
Fig. 15  Fig. 16
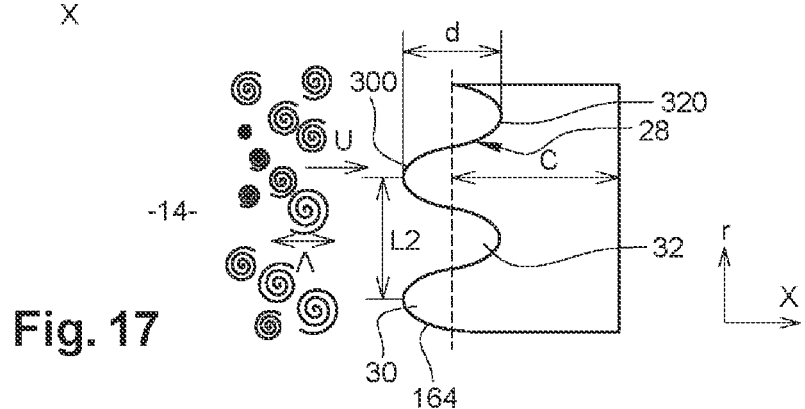
Fig. 17
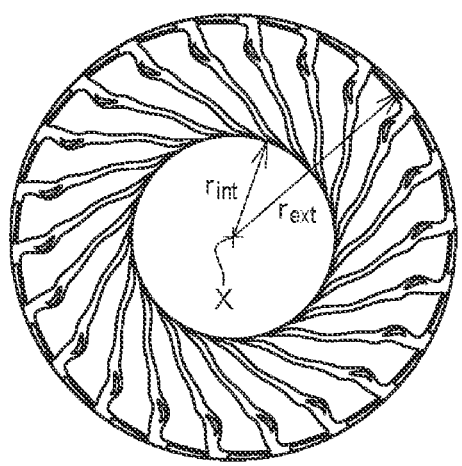
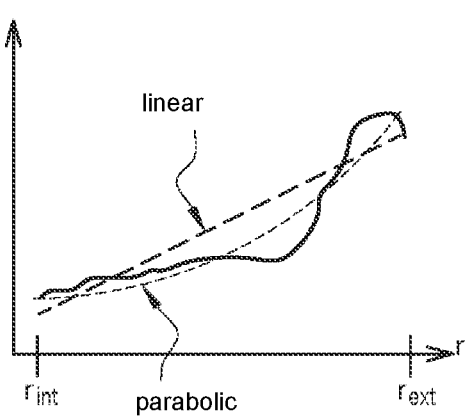
Fig. 18  Fig. 19

PROFILED STRUCTURE FOR AN AIRCRAFT OR TURBOMACHINE FOR AN AIRCRAFT

CROSS-REFERENCE TO RELATED APPLICATION

This application is a continuation of U.S. Ser. No. 16/657,278 filed Oct. 18, 2019, which claims priority to French Patent Application No. 1859663, filed Oct. 18, 2018, both of which are incorporated herein by reference.

INTRODUCTION

This invention relates to the field of the aero-acoustic management of aerodynamic profiled structures, or profiles of aerodynamic elements, such as, for example, stationary or rotating blades in an aircraft turbomachine or in a test bench for such turbomachines, or on a primary air intake slat of the turbomachine.

This type of stationary blade is found, for example, on OGV (Outlet Guide Vane) outlet guide vanes, or straightener vanes, exiting a blower, arranged downstream of a rotating body to straighten the airflow.

This type of rotating blade is found, for example, on a rotating impeller in a turbomachine, such as a blower or an unshrouded wheel.

This concerns both shrouded turbomachines (turbofans/blowers) and unshrouded turbomachines (open-rotors).

An example will be given for a ducted-fan turbine engine with a blower (front) and a straightener vane arranged in a secondary section.

Particularly in the Ultra-High Bypass Ratio turbofan engines (UHBR; ultra-high dilution ratio fairing fan engine configuration, above 15), it is envisaged to increase the diameter of the blower and reduce the length of the suspension pod fixed to the aircraft, thus reducing the distance between the blower and the intake guide vanes of IGV compressors (Inlet Guide Vanes), the OGVs and the primary air intake slat. In this type of engine, the interaction of the wake of the blower with the IGVs, the OGVs and the slat is one of the dominant sources of noise.

Beyond this observation in a turbomachine, other areas of turbomachines, but also aerodynamically profiled structures (wings, open-rotor blades—open rotor —, pylon, . . . etc) are confronted with aero-acoustic problems of interaction with the airflow.

It has therefore already been proposed, particularly in the field of aircrafts, to use aerodynamically profiled structures with a profiled leading and/or trailing edge which, following a leading and/or trailing edge line, have a serration profile with a succession of peaks and troughs.

Thus, this serration profile extends along the leading and/or trailing edge, i. e. in the direction of the elongation of the structure at the leading and/or trailing edge.

Especially on reduced rope profiles, but also on closed profiles—(line of) leading and/or trailing edge along a line or direction of elongation closed on itself—perimeter line —, as on a turbomachine primary air intake slat, noise is mainly produced at the leading and/or trailing edge, more precisely at the troughs of the serrations where pressure fluctuations are more intense.

As regards the term "rope" used in this text, it should be noted that if there is no strictly a "rope" as in the case of a slat (identified 16 below) separating the primary and secondary flows, the expression "in the direction of the rope (identified 40 below) of the profile" will be considered as corresponding to the direction of what is referred to below as the "general axis (X)" or "X axis", namely the axis along which the fluid flow generally flows over the profiled structure concerned, this axis being typically transverse, or even perpendicular, to the elongation of the profiled structure, which extends in said "direction of elongation".

It will be understood that the expression "transverse" does not imply a strict perpendicularity.

The invention aims to take into consideration the fact that a profiled structure must, in the presence of a turbulent flow (e. g. in the wake of a rotating part of a turbomachine or a boundary layer on a wall), face an inhomogeneous and/or anisotropic flow, i. e. the intensity of the turbulence and/or the size of the eddies varies in time and space. In the wake of a so-called rotating part, for example a blower, the variation is also a function of the rotational speed of the rotating part.

For this purpose, a profiled structure is provided therefor,
elongated in a direction in which the structure has a length (L1, below) exposed to an airflow, and
transversely to which the structure has a leading edge and/or a trailing edge, at least one of which is profiled and has, in accordance with said direction of elongation, serrations defined by a succession of peaks and troughs,
the profiled structure being characterized in that, along the profiled leading and/or trailing edge, the serrations have a geometric pattern transformed, over at least a part of said length (L1) exposed to the airflow, by successive scaling, via multiplicative factors, along the direction of elongation (hereinafter L2, $L2_1$, $L2_2$, $L2_3$, . . . ) and/or transversely to the direction of elongation (hereinafter d, $d_1$, $d_2$, $d_3$, . . . ).

Thus, the serrations will have a geometric pattern in the direction of elongation (length L1), with a shape that, from transformed repetition into transformed repetition, is stretched or contracted:
transversely to the direction of elongation (cf. said amplitude (d) which varies), and/or
according to the direction of elongation (i.e. a length of the pattern in the direction of elongation that varies, see variable distance (L2)).

Thus the pattern can be modified by varying the local amplitudes of the serrations by keeping the position of the minima of the troughs and the maxima of the peaks, or by varying the position of the troughs and peaks by keeping the amplitude of the peaks and troughs.

In particular, it may be expected that, since the geometric pattern that is transformed evolves in a non-periodic manner, in said direction of elongation and/or transversely to the direction of elongation, this geometric pattern that is transformed preferably evolves according to one or more law(s) of linear, quadratic, hyperbolic, exponential or logarithmic evolution.

This will facilitate the adaptation of the edge profile or trailing profile to the variable conditions of the received airflows.

To favorably take into account an established relationship between amplitude and frequency (if the transformed repetition of the geometric pattern, in the direction of elongation is called "frequency"), it is also proposed that the successive scaling (amplitude and frequency) vary so that said geometric pattern evolves in a homothetic way.

Thus, said geometric pattern will be, along all or part of the length L1, stretched or contracted and evolving in a homothetic way.

With a ratio between 20 and 1.2, between the largest and smallest amplitude, it is intended to create serrations that are both efficient in terms of acoustic efficiency and structural feasibility (mechanical strength/integration into the local environment).

By varying in a controlled manner over at least a part of said length exposed to the airflow, the profiled structure will be able to behave in a better way in the presence of an inhomogeneous and/or anisotropic, turbulent flow (e. g. in the wake of a rotating part of a turbomachine or a boundary layer on a wall), i. e. such that the intensity of the turbulence and/or the size of the eddies varies over time and space.

It is in this context that the invention proposes several heterogeneous profiles with in particular radial evolutions of the serrations according to a predefined geometric pattern.

With a comparable objective of ensuring a compromise between maximised acoustic effect and minimised mechanical stress, it is proposed that, depending on the length exposed to the airflow, the serrations should start with a peak and end with a peak, preferably the top thereof.

To differentiate the acoustic treatments by zones, it may be advisable that, over at least a part of said length (L1) exposed to the airflow, the profiled structure:

can have, by successive scaling, a geometric pattern that evolves in a stretched manner in a first zone and then in a contracted manner in a second zone, and has a connection between the first and second zones into a transition zone that smoothes this connection.

Thus, it will be possible to locally alter, by a tangent connection, the strict shape of the pattern to round off the line of its profile.

To limit the impact of the serrations to areas where turbulence is most important and to limit the disturbances induced on the aerodynamic behaviour in these zones, and this all the more so if several profiled structures, which may influence each other, are planned, is also targeted by the invention a set of profiled structures, each having all or part of the above-mentioned characteristics:

whose respective directions of elongation radially extend about a/the general axis (X), and wherein said amplitude (d) and/or distance (L2) between two geometric patterns of consecutive serrations (i. e. one said pattern and its stretched or contracted repetition following it) is greater at a radially outer end of the length exposed to an airflow than at a radially inner end of that length.

Thus, for example, in the case where said profiled structures are OGVs located downstream of a blower, and with such amplitudes and/or wavelengths (distances between two successive tops of troughs or peaks) of greater serrations near the outer casing (at the heads of OGVs) than at the roots, near the inter-jet zone, the disadvantages associated with the fact that the vortices at the end of the vane tips of the blower are larger and quite energetic on many turbojet engines would be absorbed.

As a result, we will understand all the better since is also concerned by the invention:

a turbomachine having a general axis (this may be the above-mentioned axis of revolution) and comprising a rotor, which can rotate about said general axis, and a stator, the stator or rotor comprising profiled structures, each having all or part of the above-mentioned characteristics, and in particular a turbomachine wherein the stator comprises:

an annular separation wall (inter-jets), for separating the airflow downstream of the blower into a primary and a secondary flow, stationary OGVs for guiding the secondary flow, which define said profiled structures, and/or stationary IGVs for guiding the primary flow, which define said profiled structures.

The invention will be better understood, if need be, and other details, characteristics and advantages of the invention will appear upon reading the following description given by way of a non restrictive example while referring to the appended drawings wherein:

BRIEF DESCRIPTION OF THE FIGURES

FIG. 1 is a longitudinal cross-sectional view (X axis) of a typical turbomachine for an aircraft;

FIG. 2 shows the upstream zone (slat) of the partition wall between the primary and secondary flows, with a solution in accordance with the invention;

FIG. 3 can be either detail Ill of FIG. 2, or a local serration profile diagram on what may be a helicopter blade, a blade of the blower, the rotor or the straightener vane, leading edge slat or aircraft wing flap;

FIG. 4 corresponds to the detail IV of FIG. 1;

FIGS. 15-16 schematize two other profiles with serrations according to the invention, and in particular angularly offset (angle α);

FIG. 17 is a local enlargement of an example of a serration zone, in accordance with the invention, downstream of a blower;

FIGS. 18-19 respectively schematize an axial section of turbulence intensity in the wake of a ducted-fan turbine engine, up to the OGVs, and the corresponding radial evolution of the integral scale of turbulence (^) as a function of the radius (r), between the inner radius rint and the outer radius rext of the air jet, identified 20 below, FIGS. 20-23 schematize leading or trailing edge length portions with serrated profiles having a varying amplitude and/or frequency; solid lines show the actual serrations profiles, thinner grey wavy lines show ghost serration, profiles, calculated to define the average rope and containing a reference profile from which the stretches or contractions of the actual profile have been defined, monotonic variations in amplitude and/or spacing, and FIGS. 24-26 schematize portions of leading or trailing edge length with serrations where serration transformations follow specific and monotonous (at least partially) non-periodic laws, such as linear, logarithmic and parabolic evolution, respectively.

DETAILED DESCRIPTION

Figure 5:
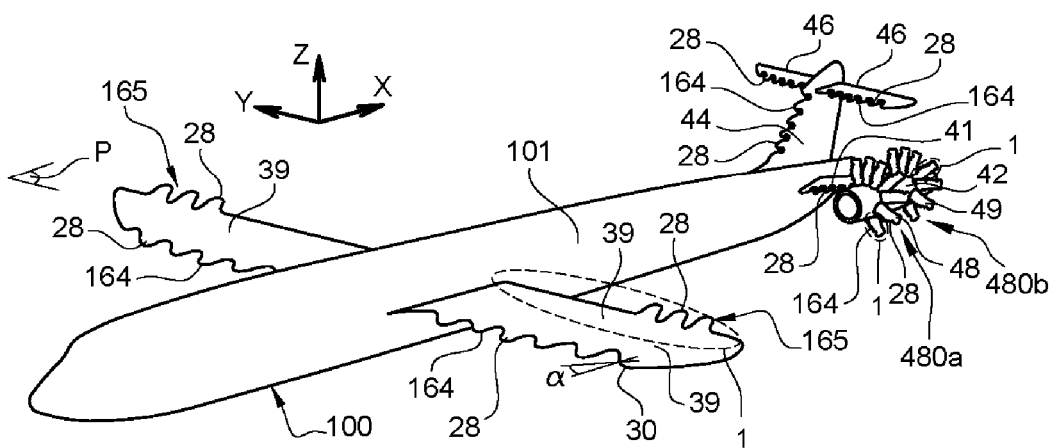
FIG. 5 schematizes an aircraft bearing structures according to the invention.

Referring to FIG. 1, an aircraft 100 turbojet 10 is schematically represented and defined as follows:

The pod 12 is used as the outer casing for the various components, including, at the front (left in FIG. 1), an upstream blower 14 (AM).

Downstream (AV) of the blower 14, the airflow (locally schematized in 38 in FIG. 4) is separated by the separator slat 16 of an annular wall 160 into a primary airflow and a secondary airflow. The primary airflow flows through an internal annular air passage or primary jet 18 when entering the low-pressure compressor 22 at the intake guide vanes 24 IGV. The secondary airflow is diverted by the separator slat 16 into an external annular air passage 20 (secondary jet) towards the outlet guide vanes 26 OGV and then towards the engine outlet.

In FIGS. 2 and 3, we can visualize more precisely the front part 161 of the separator slat 16, which includes the leading edge 164 located furthest upstream and at which the outer wall 162 of the separator slat 16 meets the inner wall 163 of the separator slat 16, the outer wall 162 forming the inner shell of the secondary jet 20.

In the present text, axial refers to anything extending along or parallel to the longitudinal axis (X) of rotation of the concerned part of the turbomachine, the axis being in principle the main axis of rotation of the turbomachine. All that extends radially to the X axis and is circumferential which extends around the X axis is radial (Z axis). All that is radially so, with respect to the X axis is internal or internal and external or external. Thus, the inner wall 163 is the radially inner wall of the separator slat 16. Moreover, any references to upstream and downstream are to be considered in connection with the flow of gases in the (part of the) turbine engine under consideration: these gases enter upstream and exit downstream, generally circulating parallel to the aforementioned longitudinal axis of rotation.

In addition, the attached drawings, and the descriptions relating to them, have been defined with reference to the conventional orthogonal reference mark X-Y-Z, with the X axis as defined above.

The separator slat 16 consists of two faces: the outer face of the outer wall 162 serving as the radially inner boundary to the outer annular air passage 20 receiving the secondary flow Fs while the inner face the inner wall 163 serves as the radially outer boundary to the inner annular air passage 18 receiving the primary flow Fp The inner wall 163 of the separator slat 16 forms the outer shell of the low-pressure compressor 22.

Although the axial offset (X) downstream of the IGVs 24 from the leading edge 164 of the separator slat 16 is less than that of the OGVs 26 from the same leading edge 164, the portion of the front part 161 directly adjacent to the leading edge 164 of the separator slat 16 is clear.

In order to reduce the noise generated by the leading edge, for example of a separator slat 16, OGV 26, IGV 24, it can therefore be expected that this leading edge 164 has a profile 28 with serrations with a succession of peaks 30 and troughs 32, as shown in the examples.

But structures other than on a turbomachine, such as the turbojet 10, may be affected by the solution of the invention and therefore have a leading edge 164 with a profile 28 with serrations with a succession of peaks 30 and troughs 32.

FIG. 5 shows an aircraft 100 on which profiled structures with such a profile 28 with serrations are present, on the leading edge, on the wings 39, on a pylon 41 supporting an engine 42 of the aircraft, on a drift 44, a stabilizer 46, one or blade 48 of an unshrouded propeller (open-rotor), or stationary blades 49 (stator) downstream of an unshrouded propeller or open rotor. In this FIG. 5, there are two aircraft propulsion turbomachines, comprising two groups of open-rotors, each with two coaxially successive rotors 480a, 480b, which can rotate about at least one axis parallel to said general axis (X), one and/or the other of these rotors comprising profiled structures 1.

In addition, FIG. 3 shows a localized serration profile 28 on what may be identified as 50, a helicopter blade, a fan blade, a part of the rotor or straightener vane, a leading edge slat or an aircraft wing flap.

All these aerodynamic profiles have in common that they generate a boundary layer on the downstream surface, and therefore a turbulent flow.

Whatever the application, as regards the profile 28 with serrations, we will consider here:

that this profile belongs to a profile structure 1 (or an aerodynamic profile), around which airflows which is elongated in a direction Z in which the structure (or profile) has a length L1 exposed to the airflow, and that, transversely to the Z direction, the structure (or the profile) 1 has a leading edge 164 and/or a trailing edge 165 (the separating slat 16 does not have a trailing edge), at least one of which is profiled and therefore has, in accordance with said Z direction of elongation, serrations (profile 28) defined by said successive peaks 30 and troughs 32.

The peaks 30 and troughs 32 come after one another, alternately

The number of peaks 30 and the number of troughs 32 will be between 3 and 100, to optimize efficiency.

Figure 20:
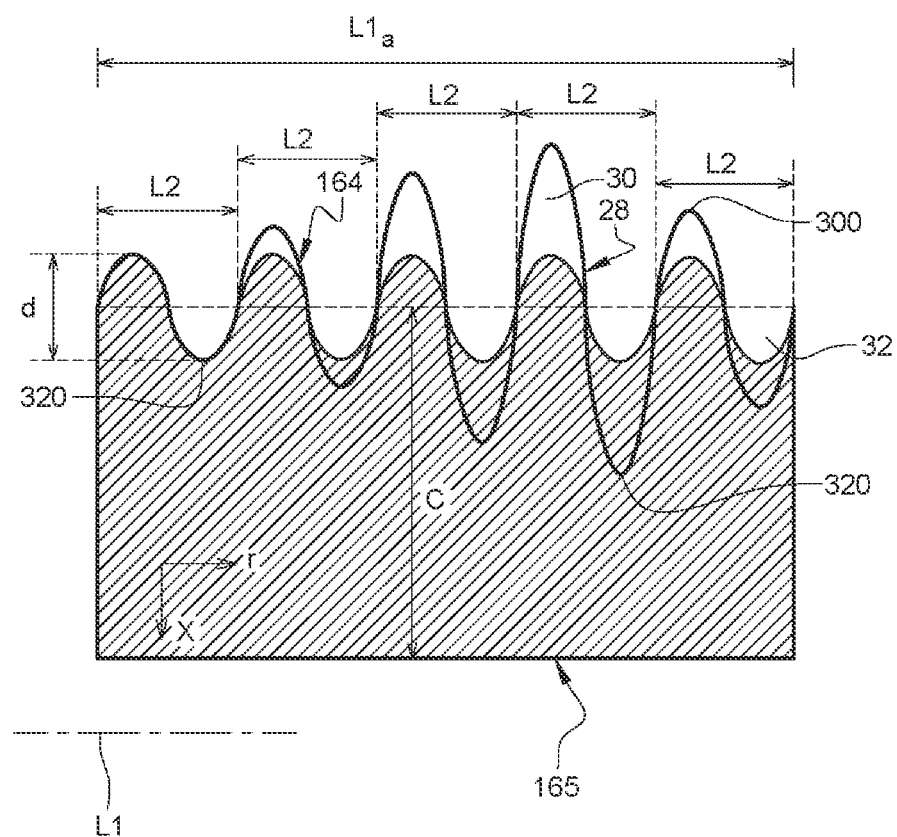
Figure 21:
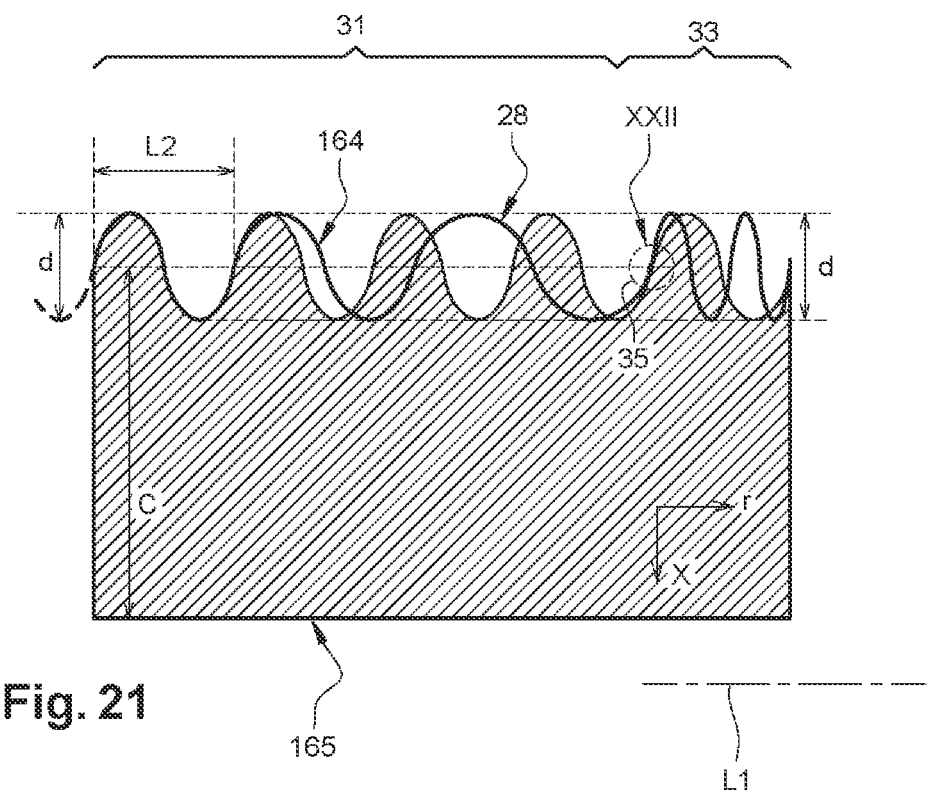
Figure 23:
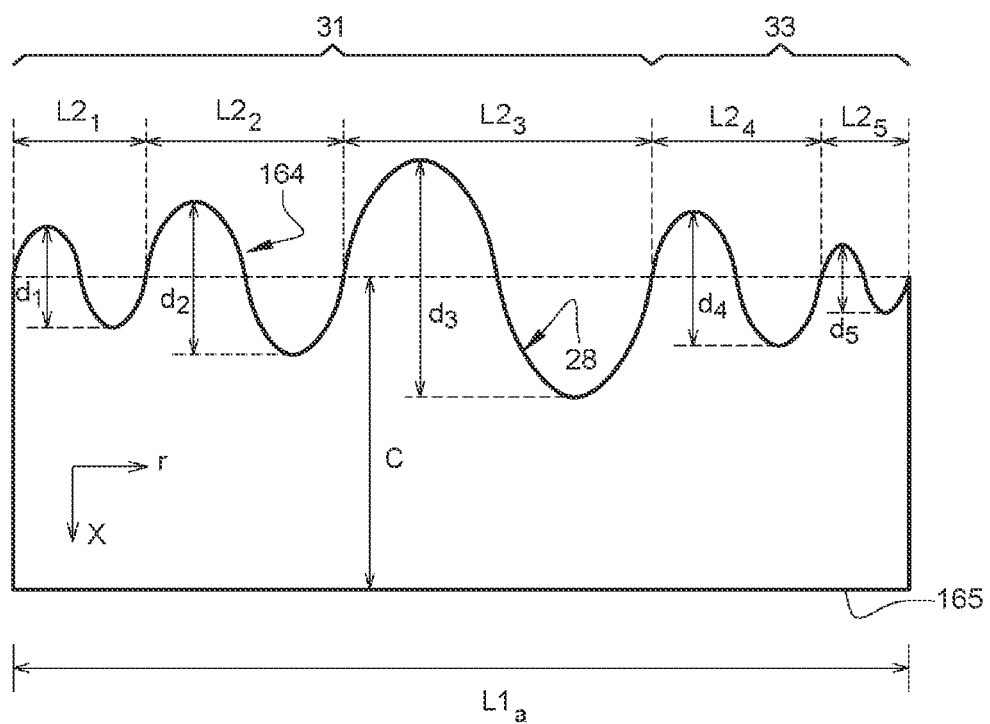

In order, as mentioned above, to take into consideration that, in many situations, one said profiled structure 1 is exposed to an inhomogeneous and/or anisotropic airflow and to ensure a compromise between the targeted noise reduction, the aerodynamic losses to be limited, as well as the mechanical stresses, and the integration of the profiled structure into its environment, it is therefore proposed that, along the profiled leading edge 164 and/or trailing edge 165, over at least a part of said length L1, serrations 28 have (see FIGS. 6,15 in particular) a geometric pattern but whose shape is repetitively stretched and/or contracted:

transversely to the direction of elongation (an amplitude that varies; see $d_1$ to $d_5$ in FIG. 23; see also FIG. 20), and/or according to the direction of elongation (a length of the repeating pattern in the direction of elongation is then variable; see lengths $L2_1$ to $L2_5$ in FIG. 23; see also FIG. 21).

Figure 22:
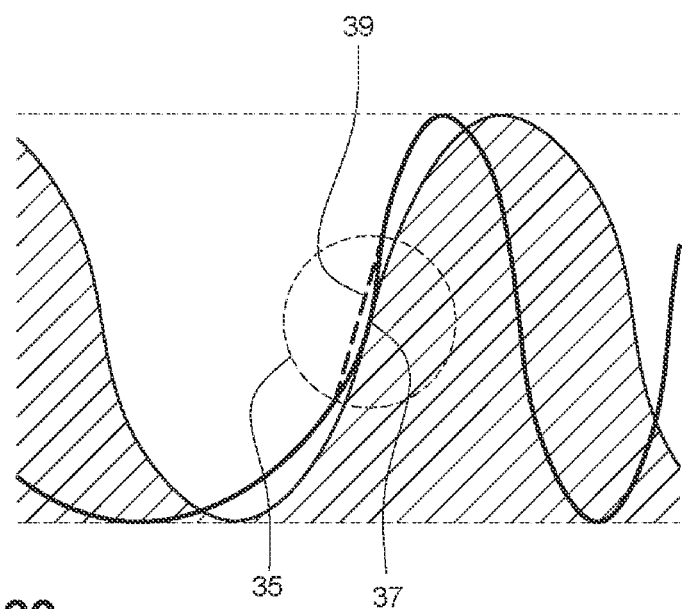

To achieve this stretching and/or contraction, a periodic serration profile was modified, defined by a repeated geometric pattern ("reference" pattern, an example of which is shown in grey in FIGS. 20-22) with two characteristic directions (e.g. the X,r directions of the concerned figures, with r≠X, and for example r=Z), by means of the following transformation: the generic pattern is scaled to the desired scale via a multiplicative factor in one characteristic direction, while in the other characteristic direction the dimensions of the pattern may remain unchanged (FIGS. 20-21), or follow a scaling (FIG. 23).

As shown in FIGS. 20-23, these stretches and/or contractions of a "reference" geometric pattern will in this case keep the pattern either in amplitude or in frequency (length of the pattern).

Thus, in FIG. 20, if we take the grey one in the figure as the pattern reference, we can see that according to the length L1, the length or frequency L2 of the pattern is preserved and that on the other hand the amplitude d varies ($d_1$, $d_2$ . . . ). In the solution of FIG. 21, it is the opposite: the amplitude d is retained and the length or frequency of the pattern varies; $L2_1$, $L2_2$, $L2_3$ . . . .

However, for zones with a high acoustic impact, stretching and/or contractions which will vary in amplitude and frequency, may be preferred, a s in the example in FIG. 23: frequency L2 and amplitude d of the pattern which vary together: $L2_1$, $L2_2$, $L2_3$ . . . and $d_1$, $d_2$, $d_3$ . . . .

Once a relationship between amplitude and frequency has been established, it may then be desirable to keep the proportions of the stretched or contracted geometric pattern; see homothety in FIG. 23.

In a serration pattern, the amplitude d can be measured, along the X axis, between a vertex 300 of peak 30 and the bottom 320 of an immediately adjacent trough 32. In other words, "d" is the maximum distance between a vertex and a bottom in a serration pattern.

It should also be noted that it may be useful to differentiate acoustic treatments zone by zone. As schematized in FIGS. 22, 23, it can therefore be expected that, over at least part of said length exposed to the airflow, the geometric pattern will be repeated in a stretched manner (zone 31) then in a contracted manner (zone 33). In some cases, depending on the patterns, frequencies and amplitudes, there may be a connection between these zones 31, 33, in a transition zone 35 (FIG. 22) that will smooth this connection. Instead of the angular connection between the lines of the two profiles (theoretical line at an angle 37), a tangent connection materialized by the dotted portion 39 should be defined, where the strict line of the adjacent ends of the two profiles is not respected, but where the connection is progressive, without marked angle. This smoothed transition zone 35 may cover up to 30% of the distance L2. It has been shown that such a transition zone (or connection zone) 35 will only ensure an efficient compromise between smoothing and aerodynamic efficiency if such a zone 35 extends over a significant length (>10%, or even >20%), whereas the opposite was assumed.

With a ratio between the largest and smallest amplitude between 1.2 and 20, including if necessary taking into account the transition/connection zone 28a mentioned below, the serrations 28 will be efficient in terms of acoustic efficiency, mechanical resistance and integration (fixation) in their local environment.

Figure 6:
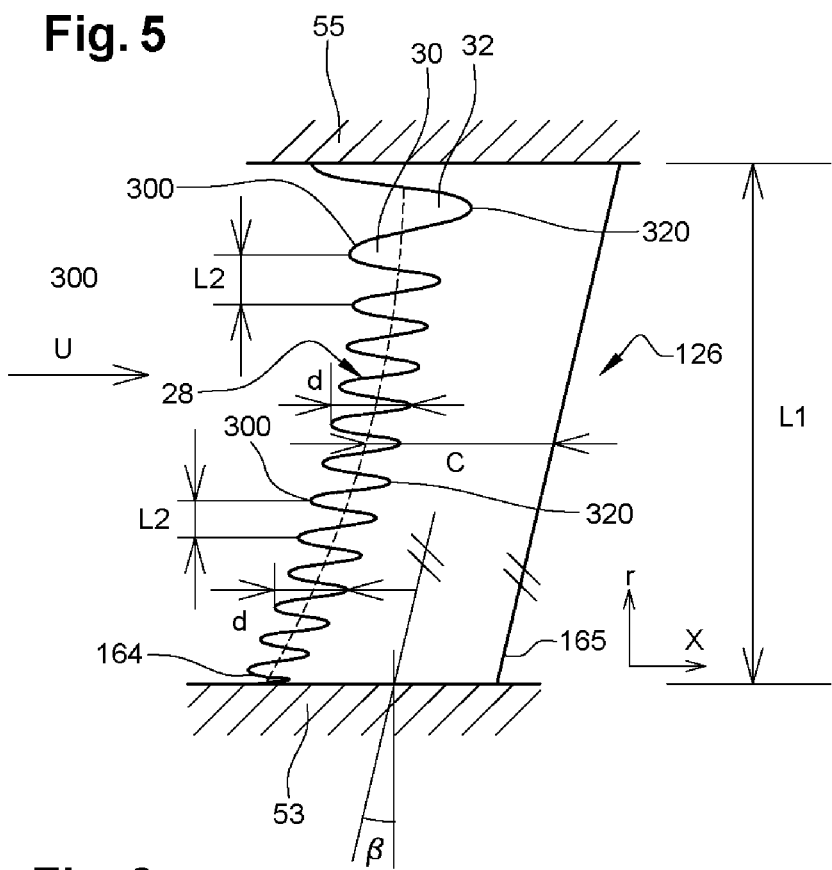
FIGS. 6 to 14 schematize various forms of serrated profiles in accordance with the invention, which may for example correspond to zone I of FIG. 1 or 5.

To usefully complete, and for the same purposes, this constraint on d and L2, it will be possible to make heterogeneous (non-uniform over their active length L1) the serration profiles 28 of all the following solutions, with thus radial evolutions of these serrations; see FIG. 6.

In particular, the successive peaks 30 and troughs 32 will only extend over a part L1a of this length L1a exposed to the airflow. A remaining part L1b of the length L1 will be smooth (i.e. without serrations); part 280.

To further refine this compromise and in particular to prevent the formation of cracks in the troughs, for example FIG. 6, illustrates the interest that serrations 28 may have in respecting, transversely to the direction of elongation Z, the following relationship: $0.0055 \leq d/c \leq 0.5$, with:

"d" the amplitude of the serrations, in m, and

"c" the rope of the profiled structure, at the place of these serrations, in m.

This rope c will be either the average rope (arithmetic mean of the rope over the length L1) over the length L1a, or the one at each serration, (one peak followed by a trough), in said direction Z; see FIGS. 6,10, and 20-22.

Figure 7:
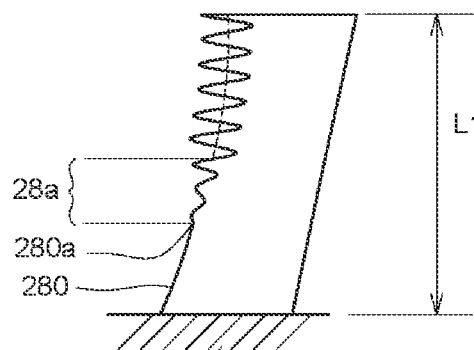
Figure 8:
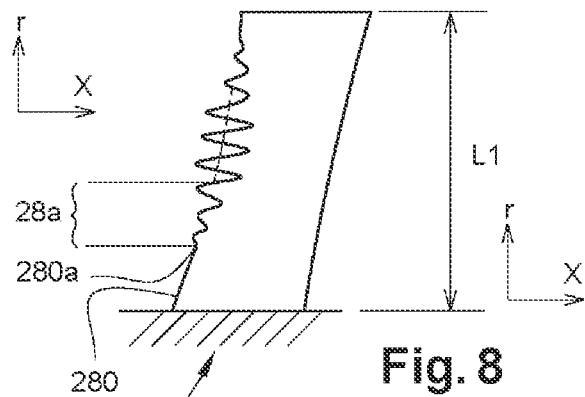
Figure 9:
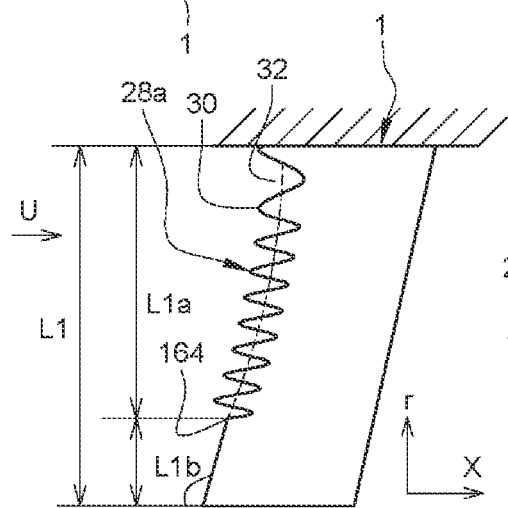

The search for the above-mentioned compromise has also revealed the interest that there may be in providing a connection, also called a transition zone, 28a where, by variation—and more precisely not necessarily monotonous overall decrease—of amplitude d and/or spacing L2 between two serration patterns in the direction of elongation, the serration will gradually connect (transition zone/connection 28a) to said smooth part 280 of the length L1 which is lacking same; cf FIGS. 7-8, and/or where the serrations 28 will end (at their connection end to the smooth part) with a zone 280a which will tangent said smooth part 280; see FIGS. 7-8.

Figure 14:
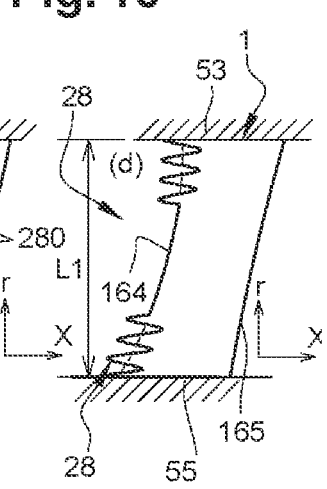

In particular in this situation, it will be of at least structural advantage that, along the length L1, serrations 28 start and/or end with a peak 30, as shown in FIGS. 6.7, or FIG. 14. In this way, certain mechanical constraints will be limited at the level of the inserts.

To seek this compromise even further may even lead to deciding that, particularly in transition zone 28a, a series of at least two (preferably three) peaks 30 and two (preferably three) consecutive troughs 32 from said part L1b of the length without any serrations will have:

a (strictly) increasing distance L2, in said direction of elongation, between two consecutive serration patterns, and/or a (strictly) increasing amplitude d, as shown in particular in FIGS. 7,8.

In addition, by providing a longer rope c on the smooth part 280 than it is at the bottom (the tops 320) of the nearest trough 32, the mechanical structure and the acoustic limiting effect will be strengthened, by promoting the definition of the transition zone 28a.

In the following, the explanations will focus on the example of the OGVs 26 in that it is typically a critical zone since it is located just downstream of the blower 14. But the characteristics concerned can be extrapolated to other cases of profiles with serrations 28.

The serrations 28 at the leading edge 164 of the OGVs 26 can disrupt the aerodynamic properties of the OGV or make the mechanical integration of the OGV into the jet 20 difficult (FIG. 1). In order to limit the impact of these serrations on the aerodynamic performance of the OGVs, on local mechanical constraints and on their integration, it was chosen that such serrations would cover only between 0.05 L and 0.95 L of the active span (length L1) of the OGV.

FIGS. 11-14 illustrate different situations of such partial areas of serrations 28 on the leading 164 and/or trailing 165 edge.

Figure 11:
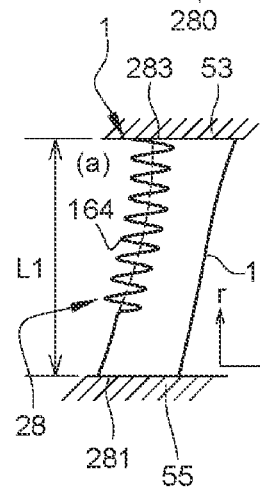
Figure 12:
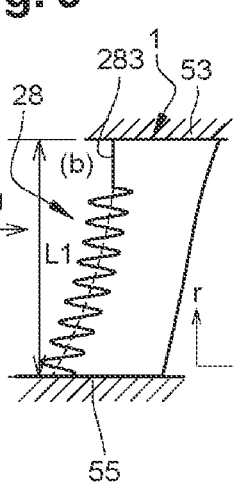
Figure 13:
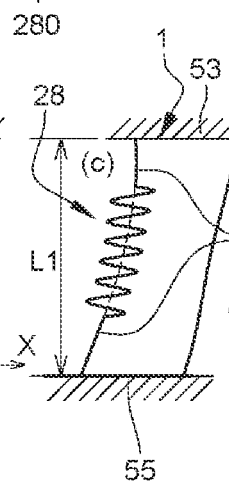

So:

In FIG. 11 serrations 28 absent at the internal end 281 of the profiles (here absent at the root of the OGV). The aim is to release mechanical and/or aerodynamic stresses at the inner end, while maintaining good attenuation of sound levels at the outer end 283 (near the outer casing 53 in the example) where the intensity of turbulence and the integral scale of turbulence are significant. The serrations near the outer casing could also be useful to avoid possible delamination of the boundary layer at certain speeds or flight conditions, In FIG. 12 serrations 28 absent at the outer end 283 of the profiles (here absent at the head of the OGV). The aim is to release the mechanical and/or aerodynamic stresses at the head while maintaining good attenuation over the rest of the profile span or to avoid possible delamination of the boundary layer at certain speeds at the root of the structure (support, e.g. central hub 55 to which the annular wall 160 may belong, FIGS. 2, 4), In FIG. 13 serrations 28 present in the intermediate part of the profile at the level, but absent at the outer 283 and inner 281 end. The aim is then to eliminate possible mechanical stresses at the junctions between the structure concerned and here the limits of the jet 20 (outer casing 53 and hub 55 in the example), by eliminating the root 281 and head 283 serrations of the OGV while retaining their interest in addressing intermediate turbulent wakes, In FIG. 14 serrations 28 present at the outer end 283 and inner end 281, but absent in the intermediate part of the profile. The aim is to limit the introduction of serrations to zones where turbulence is most severe and to remove them elsewhere so as not to disrupt the aerodynamic behaviour in these zones. In particular at a median operating speed, between idle and full speed, the delamination of the boundary layer towards the outer 283 and inner 281 ends will be limited.

As regards the shape of the serration pattern 28, it could be rounded undulations, such as sinusoidal undulations, or other shapes, such as the fir tree shape illustrated in FIG. 16. FIG. 16, but also FIG. 15, the (some) serrations 28 have an acute incident angle α with respect to the X axis.

Depending on the case, the arrow (sweep angle) of the structure 1 can also be adapted to the perpendicular to the X axis at the location of the structure.

Figure 10:
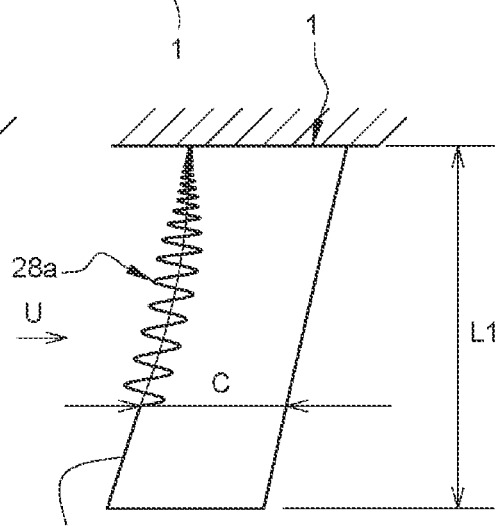

To increase the decorrelation or phase shift between the noise sources along the span, it may also be possible to choose that the profiled leading edge 164 and/or trailing edge 165 will extend along a general curved line with a concavity oriented upstream, as shown for example in FIG. 6 or 10.

It will also be understood from the above that the structure 1 on which we have reasoned can typically, as in the non-exhaustive case of an application to OGVs, belong to a set of profiled structures each having all or part of the above-mentioned characteristics, and whose respective directions of elongation Z will radially extend around the X axis.

Especially in the non restrictive case of such OGVs 1/26, it will also be possible to try to absorb the disadvantages associated with the tip vortices of the blades of the blower 14, where they are larger than elsewhere and quite energetic.

For this purpose, the aim will be that the frequency of the pattern, i. e. the distance L2 between two consecutive serration patterns and/or the amplitude d, is greater at the radially outer end 283 of the length L1 than at the radially inner end 281.

Thus, the amplitudes and/or wavelengths of the serrations 26 concerned will be greater near the outer casing 53 than near the inter-jet zone (hub 55/wall 160).

It should also be noted that the invention makes it possible to take into account the local properties of the turbulent flow U concerned, such as the one upstream of the OGVs for example, to define the geometry of the undulations as a function of the radial distribution of the integral scale of turbulence (^ in FIG. 17) in the wake of the blower 14.

In connection with this point, FIG. 6 shows an OGV 1/26 with undulations optimized according to the integral scale ^ of local turbulence along the span. It should be noted that the amplitude of the undulations and the "wavelength" L2 are much greater near the outer casing 53 than at the root of the OGV (support/hub 55). This is due to the vortices at the blade tips of the blower 14.

FIGS. 18 and 19 also show the turbulence intensity and radial evolution of the integral turbulence scale, in the wake of the blower 14, up to the OGVs 26, respectively. In this example, from the outer ⅔, the integral scale of turbulence (^) abruptly increases, to peak just before the outer radius, rext. In practice, a linear or quadratic evolution as shown in dotted line in FIG. 19 can be used to define the evolution of the serrations.

Figure 24:
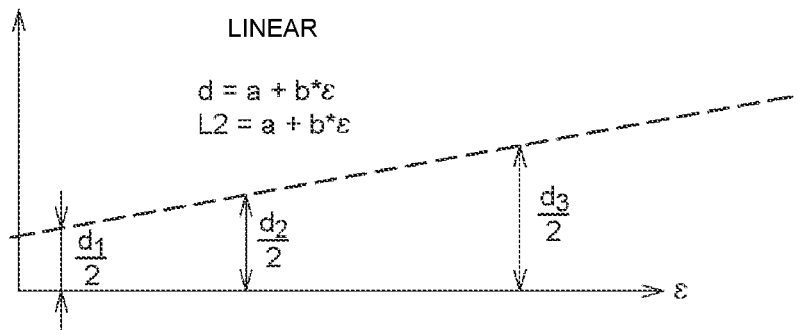
Figure 24:
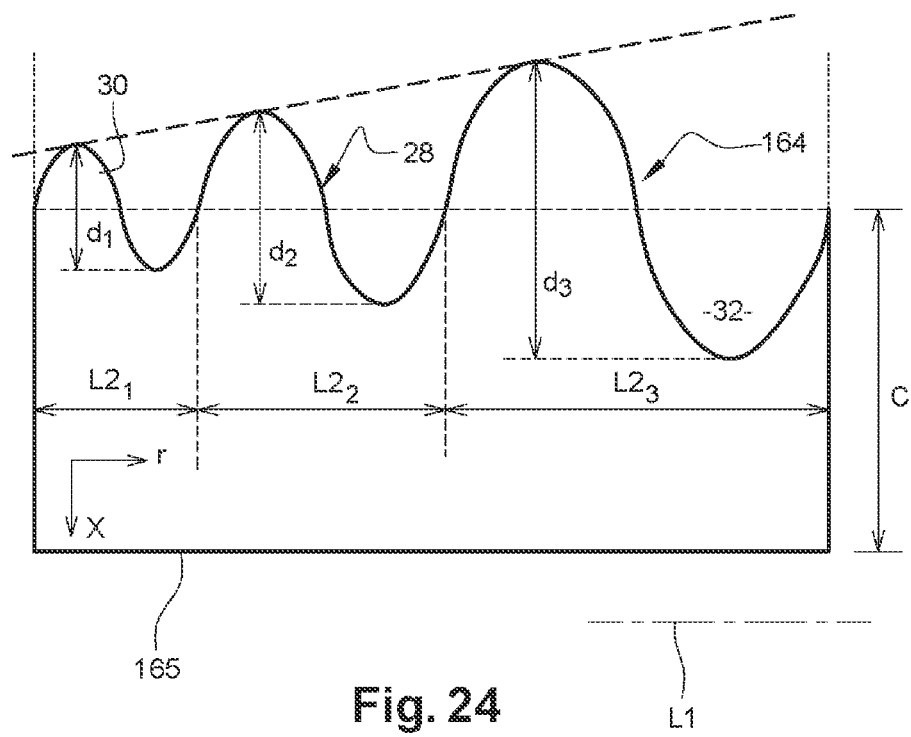
Figure 25:
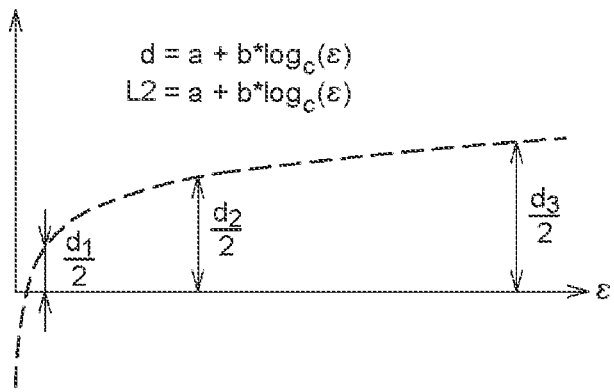
Figure 25:
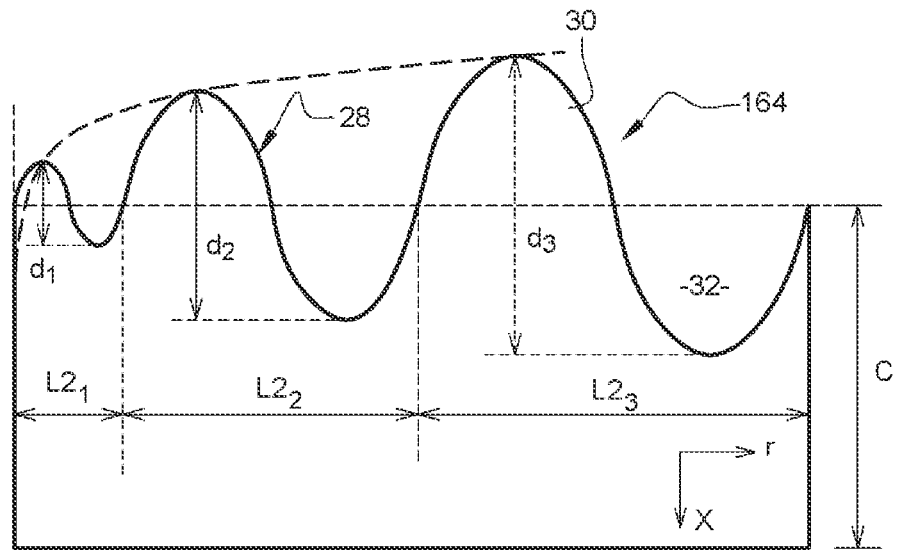
Figure 26:
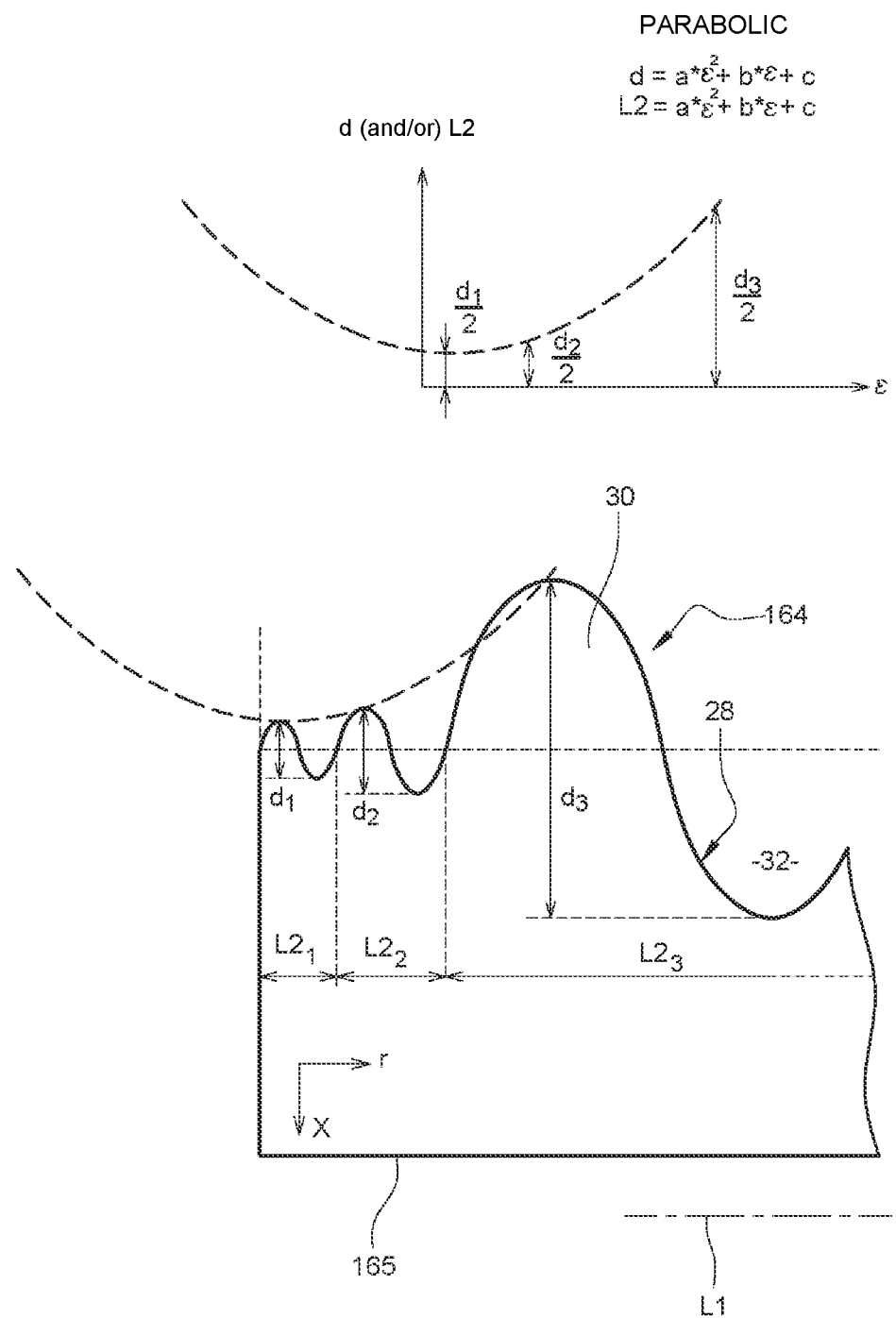

In connection with this, FIGS. 24-26 schematize three situations where, over at least a part of said length (L1) exposed to the airflow, the transformations of the serrations follow laws of respectively:
linear (FIG. 24),
logarithmic (FIG. 25),
parabolic (FIG. 26) evolution.

A quadratic, hyperbolic or exponential law may be preferred; this in amplitude ($d_1, d_2, d_3, \ldots$) and/or in distance ($L2, L2_1, L2_2, L2_3, \ldots$), in a direction of elongation.

The invention claimed is:

1. A turbomachine comprising a rotor and a stator, the stator comprising a plurality of profiled structures, each profiled structure,
    being elongated in a direction of elongation in which the profiled structure has a length exposed to an airflow, and
    having a leading edge and/or a trailing edge, at least one of which is profiled and has, in said direction of elongation, serrations defined by a succession of peaks and troughs,
    the serrations having a geometric pattern transformed, over at least a part of said length exposed to the airflow, by successive scaling, via multiplicative factors, in the direction of elongation and/or transverse to the direction of elongation,
    wherein, defined with reference to a radial distribution of the integral scale of the turbulence, the geometric pattern evolves in a non-periodic manner:
    in the direction of elongation, according to a linear, quadratic, hyperbolic, exponential or logarithmic law of evolution, and/or
    transversely to the direction of elongation, according to a linear, quadratic, hyperbolic, exponential or logarithmic law of evolution.

2. The turbomachine according to claim 1, wherein the successive scaling varies so that said geometric pattern evolves homothetically.

3. The turbomachine according to claim 1, wherein a part of the length is free of serrations and a series of at least three peaks and three troughs, consecutively, starting from said part of the length which is free of serrations, has an increasing distance, along said direction of elongation, between two tops of consecutive peaks or troughs.

4. The turbomachine according to claim 1, having a longitudinal axis around which extend blades of the rotor, and comprising an outer casing and a hub between which a vein is defined in which the airflow can flow from upstream to downstream, the outer casing extending around the hub, both extending around the longitudinal axis, the profiled structures extending in said vein, individually between the outer casing and the hub, the direction of elongation along which extend the serrations, on the leading edge, being angled with respect to a radial axis, perpendicular to said longitudinal axis.

5. A turbomachine comprising a rotor and a stator, one of which comprises a plurality of profiled structures, each profiled structure,
    being elongated in a direction of elongation in which the profiled structure has a length exposed to an airflow, and
    having a leading edge and/or a trailing edge, at least one of which is profiled and has, in said direction of elongation, serrations defined by a succession of peaks and troughs,
    the serrations having a geometric pattern transformed, over at least a part of said length exposed to the airflow, by successive scaling, via multiplicative factors, in the direction of elongation and/or transverse to the direction of elongation,
    wherein, defined with reference to a radial distribution of the integral scale of the turbulence, the geometric pattern evolves in a non-periodic manner:
    in the direction of elongation, according to a linear, quadratic, hyperbolic, exponential or logarithmic law of evolution, and/or transversely to the direction of elongation, according to a linear, quadratic, hyperbolic, exponential or logarithmic law of evolution, and, wherein the successive scaling varies so that said geometric pattern evolves homothetically.

6. The turbomachine according to claim 5, wherein a part of the length is free of serrations and a series of at least three peaks and three troughs, consecutively, starting from said part of the length which is free of serrations, has an increasing distance, along said direction of elongation, between two tops of consecutive peaks or troughs.

7. The turbomachine according to claim 5, having a longitudinal axis around which extend blades of the rotor, and comprising an outer casing and a hub between which a vein is defined in which the airflow can flow from upstream to downstream, the outer casing extending around the hub, both extending around the longitudinal axis, the profiled structures extending in said vein to be connected to both the outer casing and the hub, the direction of elongation along which extend the serrations, on the leading edge, being angled with respect to a radial axis, perpendicular to said longitudinal axis, so that the respective connections of said profiled structures to the outer casing is located further downstream than the respective connections of said profiled structures to the hub.

8. A turbomachine comprising a rotor and a stator, the stator comprising outlet guide vanes and inlet guide vanes, one of the outlet guide vanes and the inlet guide vanes comprising a plurality of profiled structures, each profiled structure, being elongated in a direction of elongation in which the profiled structure has a length exposed to an airflow, and having a leading edge and/or a trailing edge, at least one of which is profiled and has, in said direction of elongation, serrations defined by a succession of peaks and troughs, the serrations having a geometric pattern transformed, over at least a part of said length exposed to the airflow, by successive scaling, via multiplicative factors, in the direction of elongation and/or transverse to the direction of elongation, wherein, defined with reference to a radial distribution of the integral scale of the turbulence, the geometric pattern evolves in a non-periodic manner:

in the direction of elongation, according to a linear, quadratic, hyperbolic, exponential or logarithmic law of evolution, and/or transversely to the direction of elongation, according to a linear, quadratic, hyperbolic, exponential or logarithmic law of evolution.

9. The turbomachine according to claim 8, wherein the successive scaling varies so that said geometric pattern evolves homothetically.

10. The turbomachine according to claim 8, wherein a part of the length is free of serrations and a series of at least three peaks and three troughs, consecutively, starting from said part of the length which is free of serrations, has an increasing distance, along said direction of elongation, between two tops of consecutive peaks or troughs.

11. The turbomachine according to claim 8, having a longitudinal axis around which extend blades of the rotor, and comprising an outer casing and a hub between which a vein is defined in which the airflow can flow from upstream to downstream, the outer casing extending around the hub, both extending around the longitudinal axis, the profiled structures extending in said vein to be connected to both the outer casing and the hub, the direction of elongation along which extend the serrations, on the leading edge of the outlet guide vanes, being angled with respect to a radial axis, perpendicular to said longitudinal axis, so that the respective connections of said profiled structures to the outer casing is located further downstream than the respective connections of said profiled structures to the hub.

\* \* \* \* \*